Dec. 26, 1922.

F. L. WARNER ET AL.
ANTISKID WHEEL ATTACHMENT.
FILED APR. 11. 1922.

INVENTORS:
F. L. Warner
U. G. Riggs
BY
Milton S. Crandall
ATTORNEY

Dec. 26, 1922.
1,439,931

F. L. WARNER ET AL.
ANTISKID WHEEL ATTACHMENT.
FILED APR. 11, 1922.

INVENTORS:
F. L. Warner
U. G. Riggs
BY
Milton S. Crandall,
ATTORNEY

Patented Dec. 26, 1922.

1,439,931

UNITED STATES PATENT OFFICE.

FRED L. WARNER AND ULYSSIS G. RIGGS, OF ONAWA, IOWA.

ANTISKID WHEEL ATTACHMENT.

Application filed April 11, 1922. Serial No. 551,700.

*To all whom it may concern:*

Be it known that we, FRED L. WARNER and ULYSSIS G. RIGGS, citizens of the United States, and residents of Onawa, in the county of Monona and State of Iowa, have invented certain new and useful Improvements in Antiskid Wheel Attachments, of which the following is a specification.

Our present invention contemplates an improved anti-skidding attachment for motor vehicles adapted to be controlled from the driver's seat.

Another object of the invention is the production of an anti-skidding attachment for vehicle wheels which is simple and inexpensive in construction, comparatively light in weight and thoroughly efficient and dependable.

These and other objects and advantages we successfully attain in the embodiment hereinafter described, defined in the appended claims and illustrated in the accompanying drawings which form a part of this application and in which like characters of reference indicate corresponding parts throughout the several views, of which,—

Figure 1:
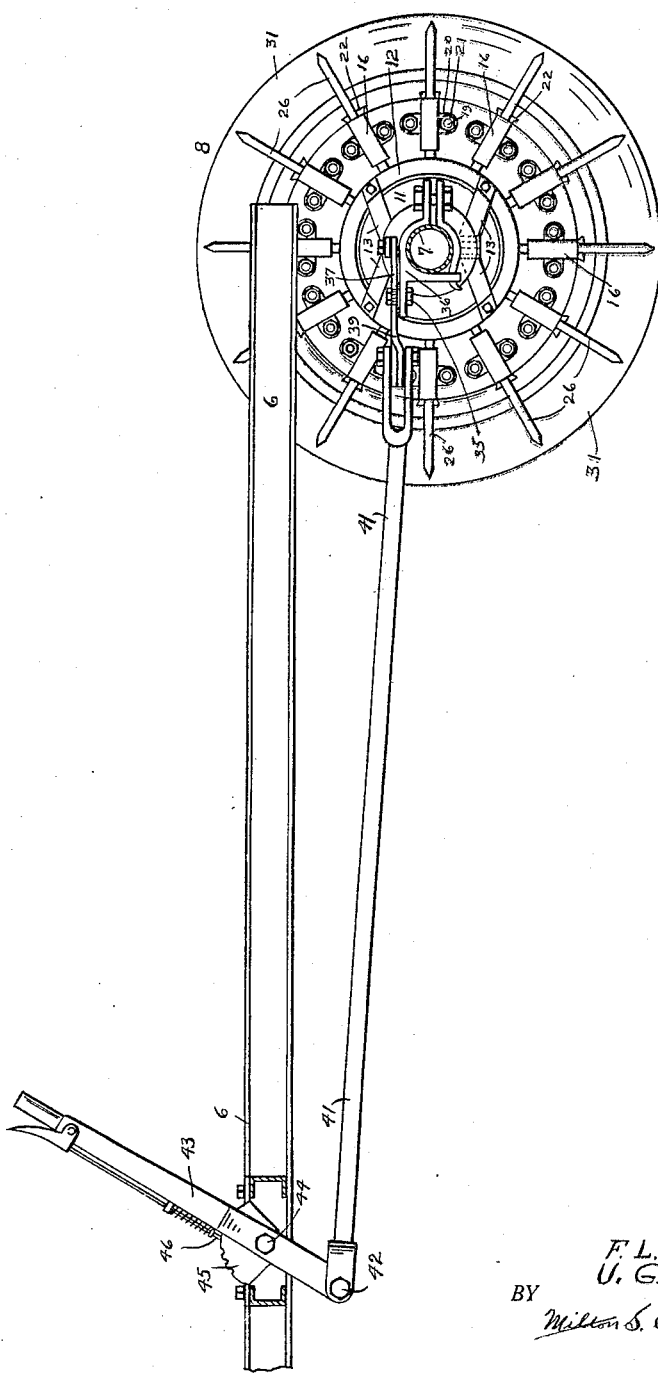
Fig. 1 is a fragmentary, longitudinal, vertical section of a motor vehicle equipped with the preferred embodiment of the invention.
Figure 5:
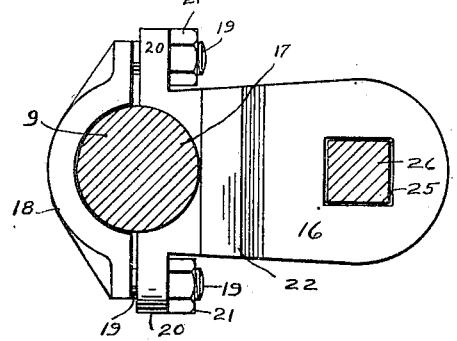
Fig. 5 is an enlarged plan of one of the road-engaging element support housings and associated parts shown in section.
Figure 2:
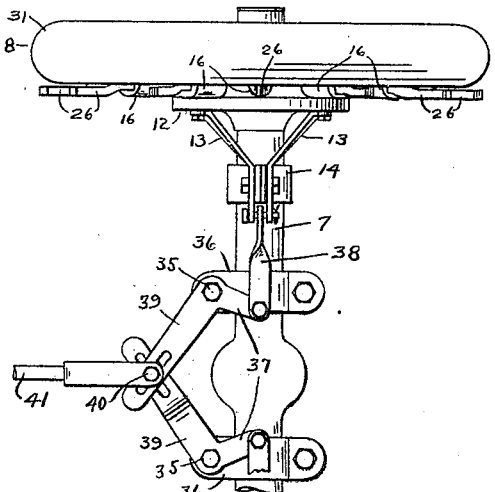
Fig. 2 is a fragmentary plan of the same.
Figure 3:
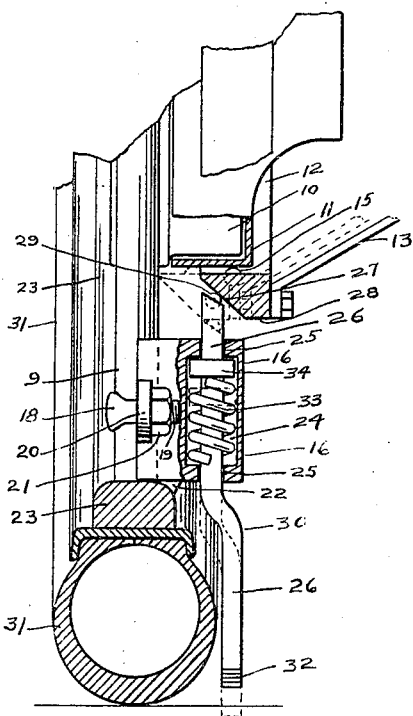
Fig. 3 is a rear elevation of one of the road-engaging elements and the devices associated therewith, parts being cut away and shown in section.
Figure 4:
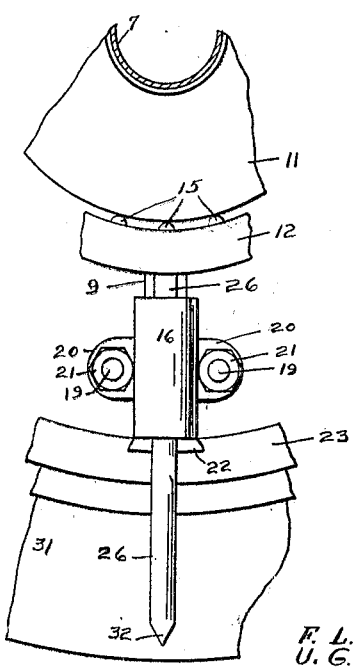
Fig. 4 is a side elevation of Fig. 3.

Although we have illustrated and hereinafter described but one embodiment of the invention, we would not be understood as being limited to such specific structure for various alterations and modifications may be made in details of construction and arrangement of parts without departing from the spirit and scope of the invention as defined in the appended claims.

Referring, now, to the illustrations, 6 represents the main frame of a motor vehicle, 7 the rear axle housing, 8 one of the rear wheels, 9 the spokes of the wheel, 10, the brake drum carried by the wheel, and 11, the brake drum housing or other element, freely encircling the brake drum carried by the rear axle housing and adapted to cooperate with our device, as will presently appear. We provide a collar, 12, which freely encircles the brake drum housing, 11, or its equivalent, and is connected by spider arms, 13, with a suitable collar, 14, slidably mounted on the rear axle hub. The side of the collar, 12, adjacent the wall is externally beveled, as at 27, leaving a comparatively narrow peripheral face, 28, on the collar, which is parallel with the axis of the collar.

It will be understood that each rear wheel is provided with our equipment, but inasmuch as the equipment of each wheel is a replica of the other we have deemed it necessary to illustrate but one equipped wheel, and it will be understood that on each end portion of the axle housing, 7, is mounted one of the collars, 14.

The collar, 12, is movable toward and from the wheel and preferably between the element, 11, and the collar are interposed anti-friction devices as the ball bearings, 15, whereby pressure on the road-engaging elements is imparted to the element, 11, without interfering with longitudinal movement of the collar, 12.

The road-engaging means which we employ consists of a series of elongated, radially disposed members, extensible and retractable to and from road-engaging positions and carried by the wheel. In the embodiment chosen for illustration we secure the road-engaging elements to the spokes of the wheel by means of supporting blocks, 16, which project from the inner face of the wheel and are provided with semi-circular recesses, 17, which receive the spokes, 9, the said blocks being suitably secured to the spokes as by clamps, 18, positioned on the outer sides of the spokes and carrying stub bolts, 19, projecting through ears, 20, on the blocks, and firmly clamping the blocks to the spokes by means of nuts, 21, screwed on the said bolts and into firm engagement with the ears, 20. To prevent rotary movement of the supporting elements, 16, from the spokes we provide on the ends of such elements projecting lips, 22, which are spaced to conform to and engage the side of the felly, 23, of the wheel. The elements, 16, are provided with longitudinal chambers, 24, and the respective ends of the elements, 16, are provided with aligned openings, 25, communicating with the chamber, 24. Extending through the openings, 25, and the chamber, 24, are flat-sided rods, 26, the openings, 25, being also flat-sided to prevent rotary movement of the rods. The inner ends of the rods, 26, are engaged with the periphery face, 27, of the collar, 12, and are preferably provided with anti-friction devices, as the balls, 29, which reduce the friction between the collar and rods. The outer end portions of the rods, 26, are offset, as at 30, from the wall to extend adjacent the side of the tire, 31. The ends of the rods, 26, are engageable with the road and are preferably beveled to a chisel point, 32. The rods are held yieldably retracted from road-engaging positions as by compression springs, 33, encircling the rods, 26, within the chambers, 24 and interposed between the outer ends of the supporting blocks, 16, and bosses, 34, on the rods.

It is now clear that by shifting of the collar, 12, toward and from the wall the beveled face thereof accordingly co-acts with the rods to force them outwardly to road-engaging position and permits them to be retracted from road-engaging positions through the action of the springs, 33.

These devices with which each rear wheel is equipped, as previously stated, are controlled by any preferred means, preferably bell-cranks fulcrumed, as at 35, on suitable bearings, 36, mounted on opposite sides of the center of the axle housing, 7, the arms, 37, of said bell-cranks being connected by suitable links, 38, with the collar, 14. The arms, 39, of said bell-cranks cross each other and are suitably pivotally secured, as at 40, to one end of a link, 41, the opposite end of which is connected, as at 42, to a suitable lever, 43, fulcrumed, as at 44, on a quadrant, 45, suitably supported by the main frame or other fixed part of the vehicle, the said lever, 43, being provided with a pawl, 46, engageable with the quadrant. By virtue of this structure now disclosed, movement of the lever, 43, in one direction forces the collars, 12, in the direction of their associated wheels to extend the road-engaging elements, 26, while movement of the lever in the opposite direction permits the said road-engaging elements to retract. It will also be evident that the lever may be operated to extend the road-engaging elements to and hold them in intermediate or partially extended positions.

Having thus described our invention, what we claim as new and desire to secure by Letters Patent of the United States, is,

1. An anti-skidding attachment for a vehicle wheel embodying supporting members suitably secured to the side of the wheel, radial rods slidable through the said members to and from road-engaging positions, means within said members holding the rods yieldably retracted from road-engaging positions, a bevel-faced collar movable toward and from the wheel, anti-friction members on the inner ends of the rods and engageable by the beveled face of the collar, whereby movement of the collar toward the wheel extends the rods to road-engaging positions, and lever-controlled means for the control of the collar.

2. An anti-skidding attachment for a vehicle wheel having an axle housing and circular member carried thereby coaxially therewith, comprising a bevel-faced collar encircling said member, anti-friction balls between the collar and said member, elongated radial rods carried by the wheel and extensible and retractable to and from road-engaging positions, anti-friction balls on the inner ends of the rods engageable with the collar, the collar being bevel face of the collar, the collar being movable toward and from the wheel to accordingly coact with the latter balls to extend the rods and permit them to be retracted, means for retracting the rods, and means for the control of the collar.

In testimony whereof, we have hereunto set our hands this 28th day of March, 1922.

FRED L. WARNER.
ULYSSIS G. RIGGS.